US 6,563,428 B1

United States Patent
Maley, Sr.

(10) Patent No.: US 6,563,428 B1
(45) Date of Patent: May 13, 2003

(54) DISASTER LIGHTING SYSTEM FOR RAILROAD CARS

(75) Inventor: William B. Maley, Sr., Orange, CT (US)

(73) Assignee: Techlite Inc., Milford, CT (US)

(*) Notice: Subject to any disclaimer, the term of this patent is extended or adjusted under 35 U.S.C. 154(b) by 0 days.

(21) Appl. No.: 09/853,797

(22) Filed: May 14, 2001

(51) Int. Cl.[7] .............................................. G08B 21/00
(52) U.S. Cl. ...................................... 340/660; 340/664
(58) Field of Search ................................ 340/660, 635, 340/636, 641, 642, 644, 657, 663, 664

(56) References Cited

U.S. PATENT DOCUMENTS

| | | | | |
|---|---|---|---|---|
| 4,369,492 A | * | 1/1983 | Moll et al. ..................... | 363/58 |
| 4,389,640 A | * | 6/1983 | Dawdy ........................ | 340/664 |
| 5,818,333 A | * | 10/1998 | Yaffe et al. .................. | 340/455 |
| 6,208,242 B1 | * | 3/2001 | Engelmann et al. ........ | 340/438 |

* cited by examiner

Primary Examiner—John Tweel
(74) Attorney, Agent, or Firm—John H. Crozier

(57) ABSTRACT

In a preferred embodiment, a disaster lighting system for a railroad passenger car of the type in which emergency lighting is provided for a first predetermined length of time if AC power is lost, including: a first sensor operatively connected to detect loss of AC power to the railroad passenger car and to provide a first output indicative thereof; a second sensor to detect loss of DC power from a central battery in the railroad passenger car or lowering of voltage thereof below a predetermined level and to provide a second output indicative thereof; and a controller operatively connected to receive the first and second outputs and to initiate disaster lighting for a second predetermined length of time if the AC power is lost and if the DC power is lost or voltage of the DC power drops below the predetermined level.

6 Claims, 1 Drawing Sheet

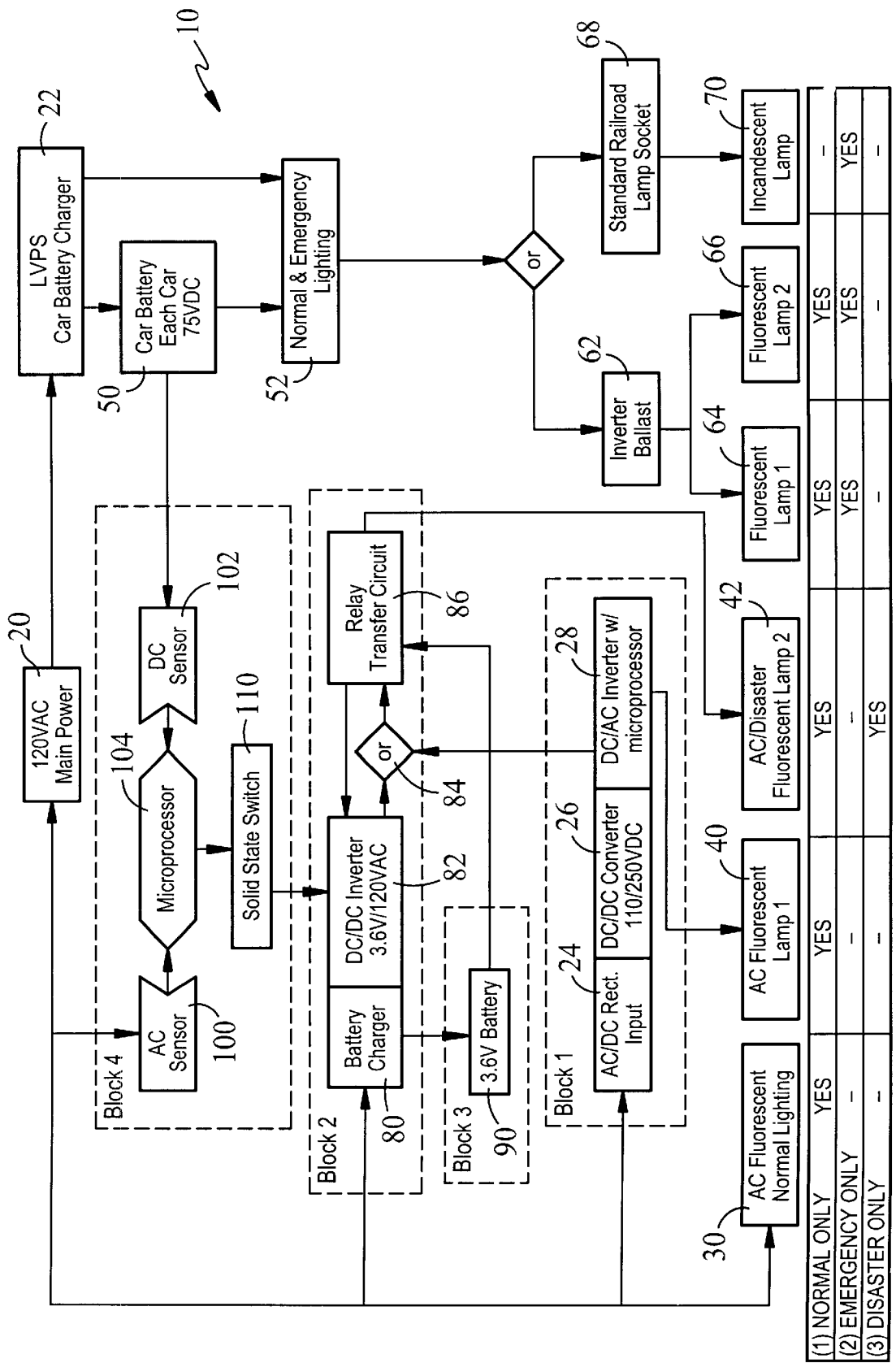

DISASTER LIGHTING SYSTEM FOR RAILROAD CARS

BACKGROUND OF THE INVENTION

1. Field of the Invention

The present invention relates to railroad passenger cars generally and, more particularly, but not by way of limitation, to a novel disaster lighting system for railroad passenger cars.

2. Background Art

Railroad passenger cars typically have both normal and emergency lighting systems. Emergency lighting power for each railroad car is provided by a central battery in the car and also an internal battery emergency ballast, both charged from a 60 Hz power source provided from the locomotive. When cars are not in service, they are stored at night and over the weekend without AC power. Unless proper steps are taken to disable the emergency lighting system, the emergency lighting system senses the loss of AC power and provides emergency lighting with incandescent lamps or fluorescent lamps with inverter ballast from the central battery until AC power is restored or the battery is totally discharged. Total discharge can occur from 8 to 12 hours, depending on the emergency load and battery condition. Lights equipped with internal battery emergency ballast are normally inhibited with a voltage sensitive relay from coming ON until the central battery voltage drops to between 15 and 30 volts. At this point, the internal battery emergency ballast provides lighting for up to 120 minutes, totally discharging the nickel cadmium emergency battery. Essentially, each day or over each weekend the internal emergency battery is discharged.

When AC power is restored, the central battery is charged from its charger and the emergency battery is charged at a trickle charge at five percent of its rated Ampere-hour capacity and requires 24 hours for full Ampere-hour capacity. A major problem with this scheme is that, should a disaster occur before the emergency battery is fully charged, the emergency battery pack would not provide the illumination for the required 90 minutes. In addition, the life of the emergency battery pack is based on 500 charge/discharge cycles. In conventional systems, the loss of AC power is so frequent that the battery life is only two years compared with building applications where a five- to seven-year life is normal.

The requirement for 90 minutes of emergency lighting is given in *Federal Register*, Vol. 64, No. 91, Wed. May 12, 1999, paragraph 238.115, pp. 25596–25598; NFPA 101, 2000 Edition, "Life Safety Code", paragraph 7.9.3, "Periodic Testing of Emergency Lighting Equipment", and APTA RP-E-013-99, "Standard For Emergency Lighting Systems Design for Passenger Cars".

"Disaster" as used herein means a situation in which normal AC power is interrupted and DC power is interrupted or the voltage thereof drops below a predetermined level. Such a disaster could occur, for example, if there is a wreck or other unusual situation in which power is lost.

Accordingly, it is a principal object of the present invention to provide a disaster lighting system for railroad passenger cars that will provide assurance that the disaster battery will not be discharged by the normal lay-up procedures of the railroad.

It is a further object of the invention to provide such a disaster lighting system that will provide lighting in the event AC power is interrupted and DC power is interrupted or drops below a predetermined voltage level.

It is an additional object of the invention to provide such disaster lighting for a period of at least 90 minutes.

It is another object of the invention to provide such a disaster lighting system that can operate for a period of at least 90 minutes even if normal AC and DC and DC emergency power is lost.

It is yet a further object of the invention to provide such a system that can be economically implemented.

It is yet an additional object of the invention to provide such a disaster lighting system that can be retrofitted to existing railroad passenger cars.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a disaster lighting system for a railroad passenger car of the type in which emergency lighting is provided for a first predetermined length of time if AC power is lost, comprising: a first sensor operatively connected to detect loss of AC power to said railroad passenger car and to provide a first output indicative thereof, a second sensor to detect loss of DC power from a central battery in said railroad passenger car or lowering of voltage thereof below a predetermined level and to provide a second output indicative thereof, and a controller operatively connected to receive said first and second outputs and to initiate disaster lighting for a second predetermined length of time if said AC power is lost and if said DC power is lost or voltage of said DC power drops below said predetermined level.

BRIEF DESCRIPTION OF THE DRAWING

Understanding of the present invention and the various aspects thereof will be facilitated by reference to the accompanying drawing figure, provided for purposes of illustration only and not intended to define the scope of the invention, on which the single drawing FIGURE is a block diagram of the system of the present invention.

DETAILED DESCRIPTION OF THE PREFERRED EMBODIMENTS

Reference should now be made to the drawing figure on which there is illustrated a railroad passenger car lighting system, including the disaster lighting system of the present invention, the system being generally indicated by the reference numeral 10.

For convenience, the table at the bottom of the figure is provided to indicate: (1) the lamps that are used for normal lighting, (2) the lamps that may be used for emergency lighting; and (3) the lamp that is used for disaster lighting, those lamps being part of a conventional railroad passenger car lighting system.

In a conventional railroad passenger car lighting system, an AC main power bus 20 furnishes 120 VAC power from the locomotive (not shown) to a car battery charger 22, to an AC/DC rectifier input 24, a DC/DC converter 26, and a DC/AC inverter with microprocessor 28 in Block 1, and to "AC fluorescent normal lighting" 30. In the conventional system, "AC fluorescent lamp 1" 40 and "AC fluorescent lamp 2" 42 are powered by AC inverter ballast with microprocessor 28 (only 40 shown on the figure as being directly connected).

Block 1 is a state-of-the art, two-lamp electronic AC-ballast for powering lamps 40 and 42 under normal conditions. This ballast operates at 120 VAC or a 277 VAC and includes program start and end of lamp life shutdown. The program start allows the cathodes to be up to 900° K, which prevents the sputtering that destroys the cathode coating and shortens the lamp life, thus increasing the number of starts from 10,000 to over 100,000. The end of lamp life circuit turns off power to both lamps 40 and 42 in the event one lamp does not light, eliminating flickering or arcing and providing for safe re-lamping. Upon replacement of the defective lamp, power is automatically reapplied to both lamps 40 and 42.

Also in the conventional system, car battery charger 22 charges central car battery 50 that provides power to normal and emergency lighting system 52. Depending on the basic railroad car design, DC power can be supplied to an inverter ballast 62 that, in turn, provides power to "fluorescent lamp 1" 64 and "fluorescent lamp 2" 66 or provides power to a standard railroad lamp socket 68 in which is inserted an incandescent lamp 70 on cars with incandescent emergency lighting. Depending on the basic railroad car design, DC power can be supplied to an inverter ballast 62 that, in turn, provides power to "fluorescent lamp 1" 64 and "fluorescent lamp 2" 66 or provides power to a standard railroad lamp socket 68 in which is inserted an incandescent lamp 70 on cars with incandescent emergency lighting.

Block 2 is connected to AC main power bus 20 and includes a battery charger 80, a DC/DC inverter 82, and OR switch 84, and a relay transfer circuit 86. Battery charger 80 provides a source of energy to recharge and maintain the charge on a 3-cell, 3.6-volt, 4000-mhr, nickel cadmium disaster battery pack 90 in Block 3. "AC fluorescent lamp 2" is powered by a DC/AC inverter 28 in Block 1 through OR switch 84 and relay transfer circuit 86 in Block 2.

The present invention adds block 4 to the above-described conventional design.

Block 4 monitors AC and DC power and includes an AC sensor 100 connected to AC main power bus 20, a DC sensor 102 connected to central car battery 50, the sensors providing inputs to a microprocessor 104 in Block 4. A solid state switch 110 in Block 4 is connected to provide an input to DC/DC inverter 82 in Block 2 and is under control of microprocessor 104. Microprocessor 104 also controls OR switch 84.

Upon loss of AC power, microprocessor 104 senses the same through AC sensor 100 and looks for DC power through DC sensor 102. If the DC voltage is above a 55 VDC level, the microprocessor will start a 120-minute timer. At this time, microprocessor 104 assumes that emergency "fluorescent lamp 1" 64 and "fluorescent lamp 2" 66 or incandescent lamp 70 are(is) providing emergency lighting.

If, at any time during the 120-minute period, DC sensor 102 detects a drop in voltage of central car battery 50 below 55 VDC, microprocessor 104 will turn ON solid state switch 110 and start DC/DC inverter 82 to provide power from disaster battery 90 to "AC fluorescent lamp 2" through relay transfer circuit 86 for a minimum of 90 minutes or a maximum of 120 minutes. If, for example, the drop in voltage of central car battery occurs 60 minutes into the 120-minute period, lighting power will be provided from disaster battery 90 for the balance of the 120-minute period, or 60 minutes. This eliminates the possibility of the depletion of disaster battery 90 and the concomitant long charging period. In any case, microprocessor 104 will shut down all power after the 120-minute period, unless terminated sooner.

Thus, lighting power is provided for a minimum of 90 minutes and a maximum of 120 minutes, depending on whether lighting power is being supplied from disaster battery 90 or a combination of the central car battery 50 and the disaster battery 90. If the voltage of central car battery 50 drops below 55 VDC after the 120-minute period, such will be neglected by microprocessor 104. This is to avoid the situation where central car battery 50 depletes after 8 to 12 hours, causing disaster battery 90 to completely discharge, which is a major problem with conventional lighting systems, as described above.

It will be understood that the 90-minute period is set by regulations and that the voltages described may be varied depending on design considerations and the requirements of specific components.

The components of system 10 may be any conventional components suitable for the purposes described and can be economically provided.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", "vertical", "horizontal", and the like, when used herein, refer to the positions of the respective elements shown on the accompanying drawing figure and the present invention is not necessarily limited to such positions.

It will thus be seen that the objects set forth above, among those elucidated in, or made apparent from, the preceding description, are efficiently attained and, since certain changes may be made in the above construction and method without departing from the scope of the invention, it is intended that all matter contained in the above description or shown on the accompanying drawing figure shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A disaster lighting system for a railroad passenger car of the type in which emergency lighting is provided for a first predetermined length of time if AC power is lost, comprising:
    (a) a first sensor operatively connected to detect loss of AC power to said railroad passenger car and to provide a first output indicative thereof;
    (b) a second sensor to detect loss of DC power from a central battery in said railroad passenger car or lowering of voltage thereof below a predetermined level and to provide a second output indicative thereof; and
    (c) a controller operatively connected to receive said first and second outputs and to initiate disaster lighting for a second predetermined length of time if said AC power is lost and if said DC power is lost or voltage of said DC power drops below said predetermined level.

2. A disaster lighting system for a railroad passenger car, as defined in claim 1, wherein: said first predetermined length of time is greater than said second predetermined length of time.

3. A disaster lighting system for a railroad passenger car, as defined in claim 2, wherein: if said AC power is lost and if said DC power is lost or voltage of said DC power drops below said predetermined level during said first predetermined length of time, said disaster lighting will be provided for said second predetermined length of time, but only up to said first predetermined length of time.

4. A method of providing disaster lighting for a railroad passenger car of the type in which emergency lighting is provided for a first predetermined length of time if AC power is lost, comprising:

(a) detecting loss of AC power to said railroad passenger car;

(b) detecting loss of DC power from a central battery in said railroad passenger car or lowering of voltage thereof below a predetermined level; and (c) initiating disaster lighting for a second predetermined length of time if said AC power is lost and if said DC power is lost or voltage of said DC power drops below said predetermined level.

5. A method of providing disaster lighting for a railroad passenger car, as defined in claim 4, further comprising: providing said first predetermined length of time greater than said second predetermined length of time.

6. A method of providing disaster lighting for a railroad passenger car, as defined in claim 5, further comprising: if said AC power is lost and if said DC power is lost or voltage of said DC power drops below said predetermined level during said first predetermined length of time, providing said disaster lighting will for said second predetermined length of time, but only up to said first predetermined length of time.

* * * * *